(12) United States Patent
Kanno

(10) Patent No.: US 7,821,768 B2
(45) Date of Patent: Oct. 26, 2010

(54) LAMINATED VARIABLE CAPACITOR

(75) Inventor: Masayoshi Kanno, Kanagawa (JP)

(73) Assignee: Sony Corporation, Tokyo (JP)

( * ) Notice: Subject to any disclaimer, the term of this patent is extended or adjusted under 35 U.S.C. 154(b) by 177 days.

(21) Appl. No.: 11/736,366

(22) Filed: Apr. 17, 2007

(65) Prior Publication Data

US 2007/0242411 A1 Oct. 18, 2007

(30) Foreign Application Priority Data

Apr. 18, 2006 (JP) ............................ 2006-114858

(51) Int. Cl.
 *H01G 7/00* (2006.01)
 *H01G 7/06* (2006.01)
 *H01G 5/00* (2006.01)
(52) U.S. Cl. ...................... 361/281; 361/277
(58) Field of Classification Search ................ 361/277, 361/278, 280, 281, 282, 301.4, 303, 309, 361/321.2, 321.3, 310, 306.3, 306.1, 306.2, 361/321.1, 320

See application file for complete search history.

(56) References Cited

U.S. PATENT DOCUMENTS

| 3,569,795 A | * | 3/1971 | Gikow | 361/434 |
| 4,590,537 A | * | 5/1986 | Sakamoto | 361/306.3 |
| 6,737,930 B2 | * | 5/2004 | Toncich | 333/24 C |
| 2003/0227738 A1 | * | 12/2003 | Togashi | 361/306.1 |
| 2006/0007634 A1 | * | 1/2006 | Togashi et al. | 361/306.3 |
| 2006/0279903 A1 | * | 12/2006 | Togashi et al. | 361/303 |

FOREIGN PATENT DOCUMENTS

| JP | 62-259417 | | 11/1987 |
| JP | 02302017 A | * | 12/1990 |
| JP | 03261122 A | * | 11/1991 |
| JP | 2000208361 A | * | 7/2000 |

* cited by examiner

*Primary Examiner*—Eric Thomas
*Assistant Examiner*—David M Sinclair
(74) *Attorney, Agent, or Firm*—K&L Gates LLP

(57) ABSTRACT

A laminated variable capacitor including: input-output terminals for inputting an alternating-current signal and outputting an output signal; and controlling terminals for controlling a capacitance value for voltage of the input alternating-current signal; wherein a total area of external electrodes for input and output connected to said input-output terminals is larger than a total area of external electrodes for control connected to said controlling terminals, or the external electrodes for input and output connected to said input-output terminals are different in structure from the external electrodes for control connected to said controlling terminals.

12 Claims, 6 Drawing Sheets

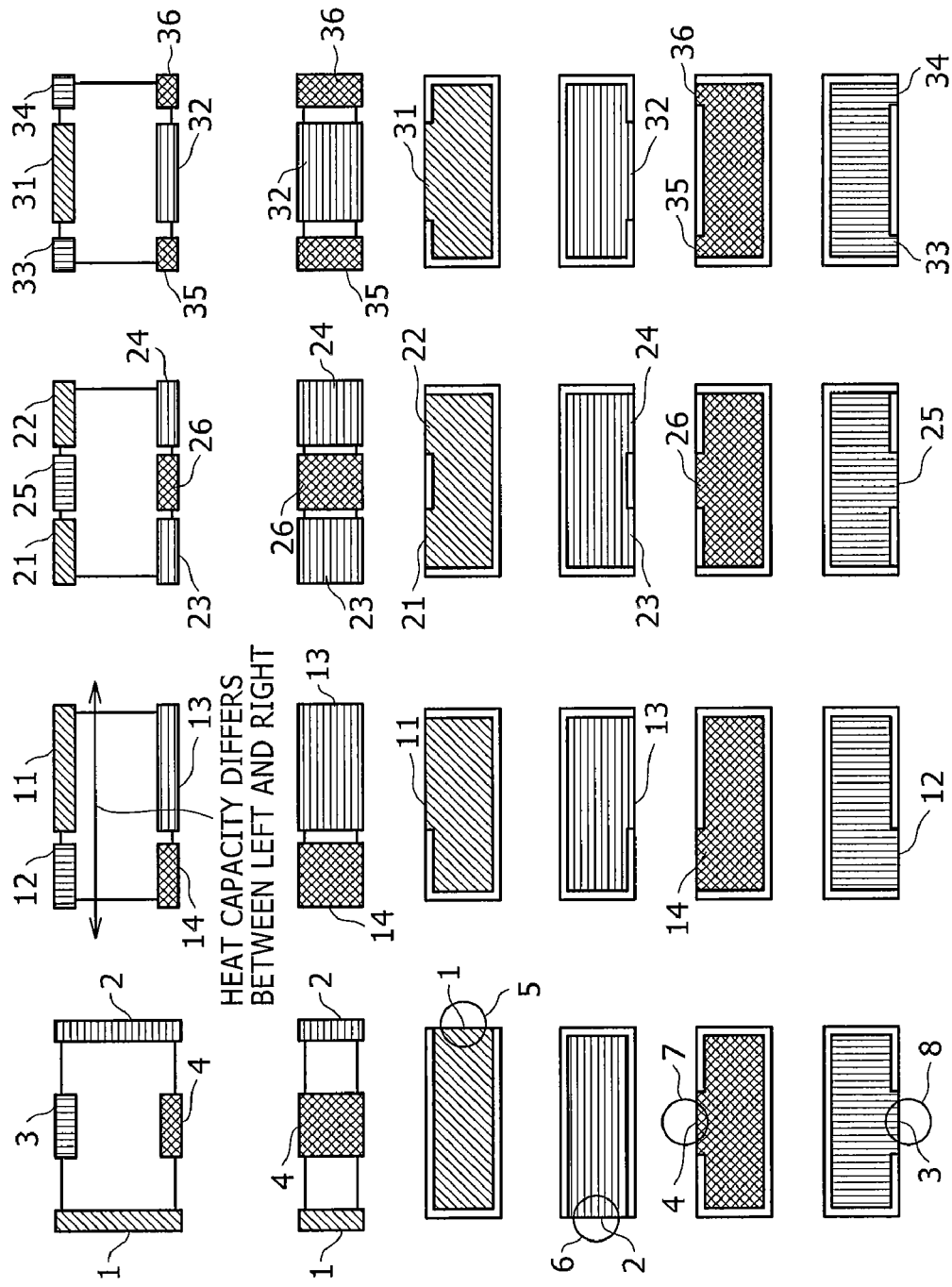

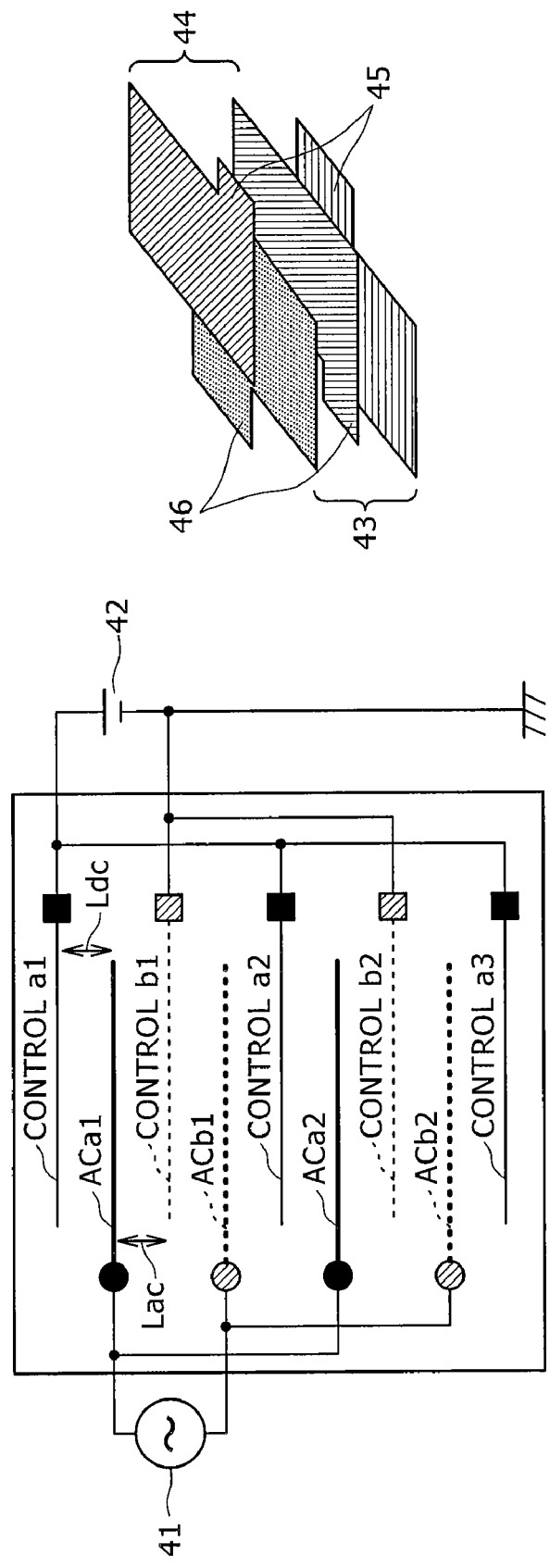

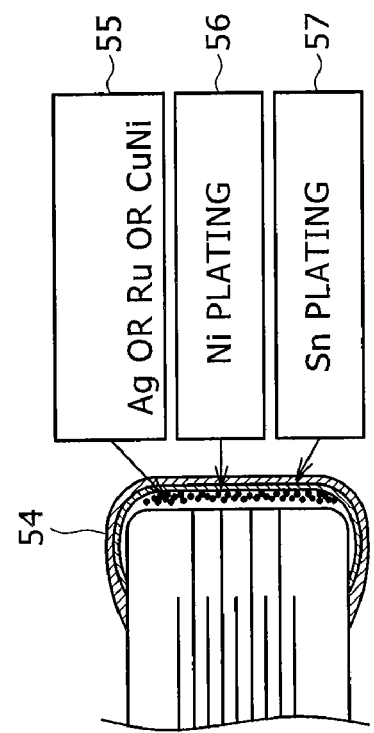
FIG. 3C
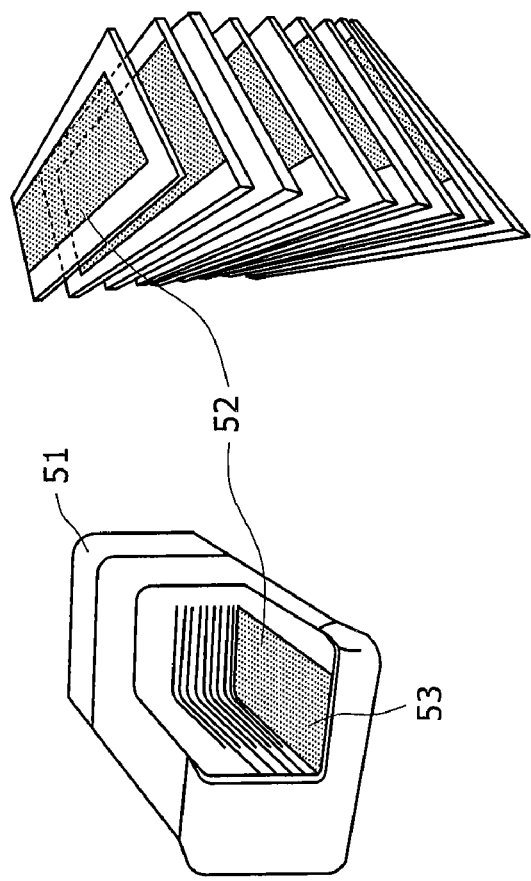
FIG. 3B
FIG. 3A

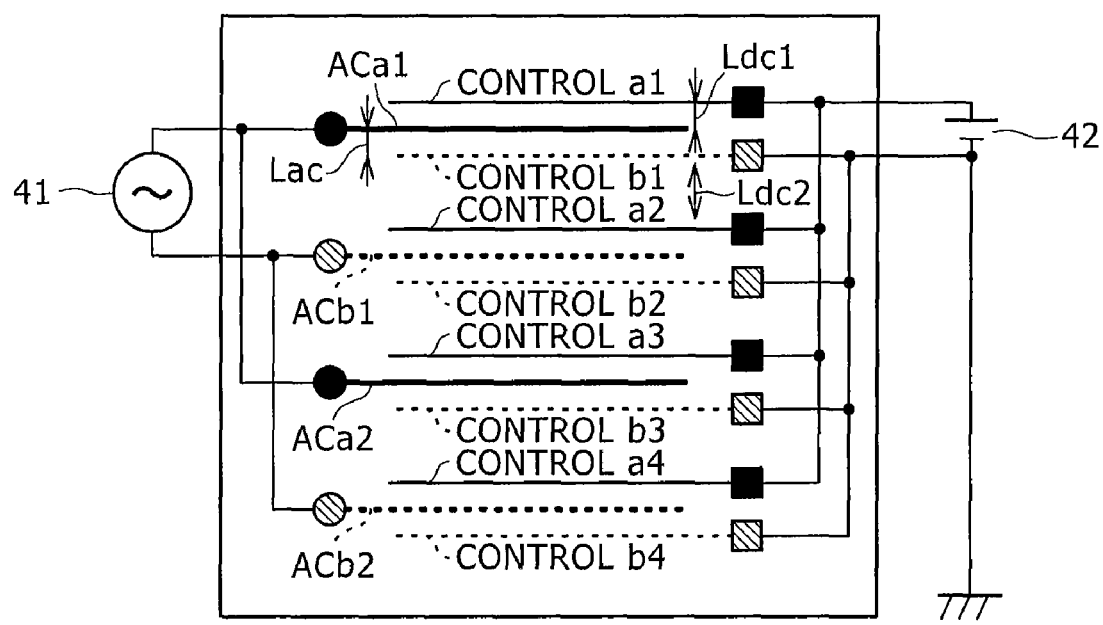
F I G . 5

LAMINATED VARIABLE CAPACITOR

CROSS REFERENCES TO RELATED APPLICATIONS

The present application claims priority to Japanese Patent Application JP 2006-114858, filed in the Japanese Patent Office on Apr. 18, 2006, the entire contents of which being incorporated herein by reference.

BACKGROUND

The present application relates to a variable capacitor suitable for application in controlling voltage or current in an electric device or an electronic device, and particularly to an electrode structure of the variable capacitor.

Recently, convenience and efficiency of electronic technology have been appreciated, and the spread of electronic devices typified by IT (information technology) and AV (audio visual) devices has been accelerated worldwide. At the same time, limitation of a global environment and earth resources has been keenly pointed out, and energy-saving technologies for devices have been strongly desired.

For example, power supplies for electronic devices continue to be improved in efficiency, and some switching power supplies have achieved a high efficiency of 90% or more. In an actual situation, however, many low-efficiency power supplies are still used with cost and noise taken into account.

In addition, even high-efficiency power supplies are affected by variations in input power supply voltage, parts variations, and changes in load current, and are greatly decreased in efficiency at a time of low power consumption, for example.

Generally, the power supply is designed to have high efficiency at the rated load (power) of the device. In an actual device, however, operating power is always varying, and the efficiency is also varying at the same time. Taking a television receiver as an example, power to the television receiver is varied greatly depending on audio output and the luminance of the screen. In other words, there is an optimum input voltage for a magnitude of load current.

In addition, the power supply is affected by variations in voltage of a commercial power supply, and therefore has lower power supply efficiency than specifications in actual operation. This is true regardless of whether a power supply system is a switching regulator system or a series regulator system.

FIG. 6 is a diagram showing the efficiency of a transformer. For example, in general, the transformer has a minimum efficiency at a time of no load because a no-load loss 73 occurs even at the time of no load, and thereafter raises efficiency 71 as load current is increased. However, a load loss 72 occurs with the square of the load current. Therefore, when the current exceeds a certain range, the load loss 72 becomes a main factor in a total loss, and thus the efficiency 71 is decreased instead.

In a power supply using the lowering of voltage by a capacitor as shown in FIG. 7, for example, as a power supply that does not actually use a transformer, one terminal of an alternating-current (AC) 100-V commercial power supply 81 is connected to one input terminal of a rectifier circuit 83 formed by a diode bridge via a capacitor 82. Another terminal of the commercial power supply 81 is connected to another input terminal of the rectifier circuit 83. A Zener diode 85 for voltage regulation and a smoothing capacitor 86 are connected in parallel with each other between one output terminal 84a and another output terminal 84b of the rectifier circuit 83.

Such a power supply shown in FIG. 7 that does not use a transformer directly rectifies commercial power 81, and thereafter obtains a stable direct-current voltage (DC) between the output terminals 84a and 84b via the Zener diode 85 forming a regulator.

At this time, the capacitor 82 lowers voltage in advance to lighten a load on the Zener diode 85 forming a regulator.

Thus, the capacitor 82 is often used in the case of low power. This is because with a voltage drop effected by the capacitor 82, the voltage is out of phase with current and therefore no power loss occurs. The capacitor 82 is thus used in a power supply for standby power, for example. However, this circuit varies rectified output according to load variations and the like. Thus, generally, the circuit is configured so as to be adjusted to a maximum load, and power is dissipated by the regulator at a time of light load, whereby stable voltage is created.

In addition, the voltage drop across the capacitor 82 changes greatly according to variations in frequency and load current. Therefore the capacitor 82 cannot be used in a device involving a high load current and great load variations. The capacitor 82 is thus limited to use for a very low power of a few ten mW such as standby power or the like in the present situation.

The power supplied by the power supply of FIG. 7 that does not use a transformer can be increased by connecting another predetermined capacitor in parallel with the capacitor 82 at a time of an operation consuming high power through a relay or the like. However, to deal with a wide load range requires switching of the plurality of capacitors.

The switching of the plurality of capacitors through the relay or the like is possible in principle, but is not practical in consideration of not only space and cost but also slow response, occurrence of noise at a time of switching, inability to change capacitance continuously, and poor durability. Therefore a device is required which can continuously change the capacitance value according to load variations.

Incidentally, there is for example a varicap using a capacitance between terminals of a diode as a capacitor whose capacitance can be electrically controlled for use in a high-frequency circuit. However, the varicap cannot be used for power control because the capacitance value, withstand voltage and the like of the varicap are not suitable.

Generally, the capacitance of a capacitor, including for example variable capacitors using a MEMS (microelectromechanical system) in recent years, is determined by a dielectric constant, electrode area, and a distance between electrodes. Therefore it suffices to control one or more of them. Control of capacitance of a capacitor which control is actually proposed in MEMS is a method of changing a distance between electrodes or an opposed electrode area by displacing an electrode.

Patent Document 1 (Japanese Patent Laid-open No. Sho 62-259417) discloses an example of changing capacitance by 70% by applying 50 V to a ceramic capacitor and thereby changing a dielectric constant. Changing the cutoff frequency of a filter circuit or the oscillation frequency of a time constant oscillator circuit is proposed as an application.

A power loss in an electronic device or an electronic circuit as described above leads not only to an increase in power used and extra electricity charges borne by users but also to a waste of earth resources and acceleration of global warming. It is desirable that the power loss be minimized.

In a series regulator system using a power transformer with a simple circuit and low noise, voltage is lowered to a necessary voltage by the power transformer connected to a commercial power supply, thereafter rectified by a diode, and then smoothed by a large-capacitance capacitor. The rectified output is unstable, and therefore the voltage is stabilized by a regulator for controlling a voltage drop between terminals of a transistor.

The voltage drop in this case is a direct-current voltage drop, and is basically all converted into heat, so that a great power loss occurs. A necessary amount of the voltage drop is greatly affected by variations in characteristics of the power transformer and other parts, the magnitude of load current, and the like. When a margin is provided for stable operation of the electronic device, a power loss is greatly increased in a normal state, and results in an efficiency of 30% in extreme cases.

In a switching regulator system, voltage is stabilized by on-off control of a semiconductor element. Therefore the power loss is small and a high efficiency is obtained. Even so, the efficiency is changed according to input or load conditions, and the efficiency is degraded under a light-load condition or the like. There is accordingly a desire to deal with a wider range of input and load variations.

Thus, for power use, a variable capacitor device having control terminals for varying capacitance, having large capacitance, having high withstand voltage, and permitting a high current is required, and high reliability is further required.

In this variable capacitor, normally, control voltage is constant and no current flows in principle. Although a transient current flows when the control voltage is changed, the value of the current is very low. A great advantage of this power controlling device lies in such minimum power being required for control. Hence, required specifications differ greatly between electrodes for control and electrodes for input and output, and thus consideration needs to be given to reliability and productivity in manufacturing.

SUMMARY

It is desirable to provide a variable capacitor capable of controlling alternating-current (AC) power with a low power loss and low noise, at low cost and with high reliability.

In an electrode structure of a variable capacitor according to an embodiment, to increase a permissible current value, the size of controlling external electrodes, through which no current flows, is made smaller as compared with the size of input-output electrodes, whereby an amount of expensive material to be used can be reduced.

As in an ordinary capacitor, input-output terminals are disposed on the sides of shorter sides, so that existing equipment can be used. Controlling terminals whose reliability may be somewhat lower are disposed on the sides of longer sides and manufactured in a separate process, so that additional cost of equipment is reduced.

Alternatively, by disposing both the terminals on the sides of the longer sides, reliability can be secured even with a terminal configuration in two surfaces without a reduction in size of the input-output external electrodes.

In addition, as for internal electrodes, distances between the electrodes are substantially equal to each other, and the input-output electrodes are interposed between the controlling electrodes. Therefore structural symmetry is maintained, and stable characteristics are obtained.

According to an electrode structure of a variable capacitor according to an embodiment, specifications for internal electrodes and external electrodes for input and output can be separated from specifications for internal electrodes and external electrodes for control, and therefore reliability and productivity can be made compatible with each other easily. When controlling terminals are disposed on the sides of longer sides, a four-terminal variable capacitor can be manufactured inexpensively by reducing electrode size.

When both the input-output terminals and the controlling terminals are provided on the sides of the longer sides, connection from the internal electrodes in the same terminal surfaces to the external electrodes can be made easily. It is therefore possible to handle the variable capacitor easily with fewer changes in orientation of the part, reduce electrode size, and manufacture the variable capacitor at low cost. In addition to the reduction of the electrode size, it is possible to use inexpensive nickel as a material for the controlling electrodes, and reduce thickness of the electrodes.

Additional features and advantages are described herein, and will be apparent from, the following Detailed Description and the figures.

BRIEF DESCRIPTION OF THE FIGURES

FIGS. 1A, 1B, 1C, and 1D show examples of the outside and electrodes of a variable capacitor according to an embodiment, FIG. 1A showing an example where input-output electrodes are disposed on the sides of shorter sides and control electrodes are disposed on the sides of longer sides, FIG. 1B showing an example where the control electrodes and the input-output electrodes are disposed on the sides of the longer sides, FIG. 1C showing an example where the control electrodes and the input-output electrodes each divided into two parts are disposed on the sides of the longer sides, and FIG. 1D showing an example where the input-output electrodes and the control electrodes each divided into two parts are disposed on the sides of the longer sides;

FIGS. 2A and 2B show an internal electrode configuration of the variable capacitor, FIG. 2A showing a circuit configuration representing electric connections, and FIG. 2B showing an example of lamination of internal electrodes and connection of the internal electrodes to external electrodes;

FIGS. 3A, 3B, and 3C show the structure of an ordinary laminated ceramic capacitor, FIG. 3A being a partially cutaway perspective view, FIG. 3B being an internal perspective view, and FIG. 3C being a partially sectional view;

FIG. 5 is a diagram showing a configuration of internal electrodes in a case of a small distance between controlling electrodes;

DETAILED DESCRIPTION

Figure 4A:
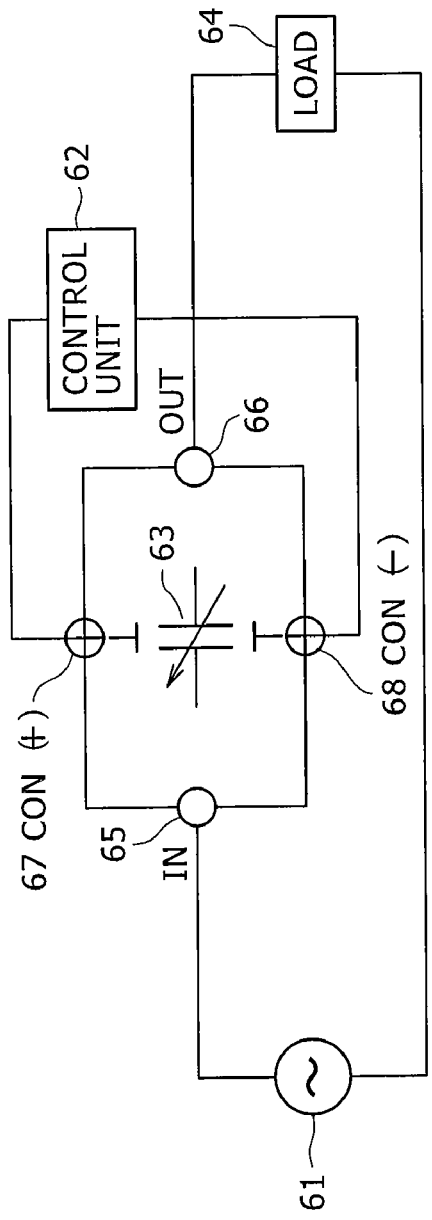
FIGS. 4A and 4B are diagrams of assistance in explaining examples of operation of the variable capacitor, FIG. 4A being a circuit diagram, and FIG. 4B being an operation diagram.

FIGS. 3A, 3B, and 3C show the structure of an ordinary laminated ceramic capacitor, FIG. 3A being a partially cutaway perspective view, FIG. 3B being an internal perspective view, and FIG. 3C being a partially sectional view.

Generally, a laminated ceramic capacitor is formed by integrating a plurality of layers of dielectric ceramic 53 and layers of internal electrodes 52 alternately laminated as shown in FIGS. 3A and 3B. A conductive paste is prepared by making metallic fine power (Pd or Pd/Ag or Ni) as material for the internal electrodes 52 into a paste. Printing is performed on a ceramic green sheet as a dielectric using the conductive paste. The ceramic green sheet has a titanium oxide base or a zirconium base used for temperature compensation, or has a barium titanate base used as a high dielectric constant base.

Then, a plurality of ceramic green sheets and conductive paste layers are alternately laminated into a layered form, integrated by heating and compression bonding, and fired at a high temperature in a reducing atmosphere. Thereby the layers of the dielectric ceramic 53 and the layers of the internal electrodes 52 are integrated with each other.

Further, a terminal electrode 51 as a terminal for external connection, the terminal electrode 51 being drawn out from the internal electrodes 52 to the outside, is formed. Thereby a completed electronic part is obtained. As shown in FIG. 3C, Ni plating 56 is provided on a base electrode 55, and further Sn plating is provided on the upper surface of the Ni plating 56, whereby the terminal electrode 51 forms a plated electrode product 54.

Figure 4B:
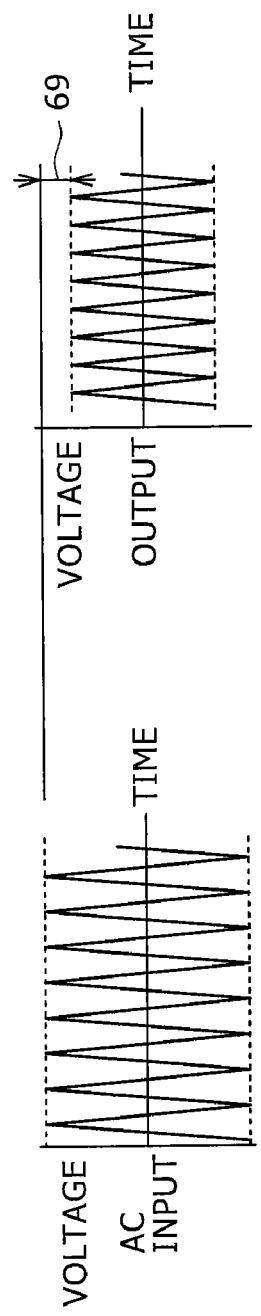
Figure 4B:
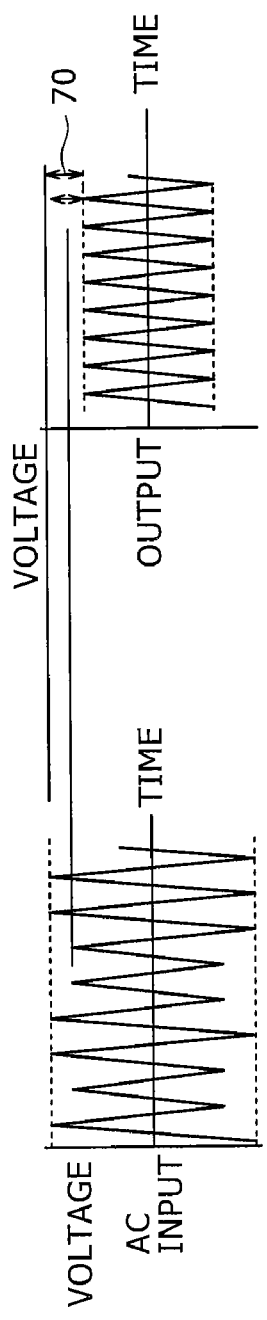
Figure 6:
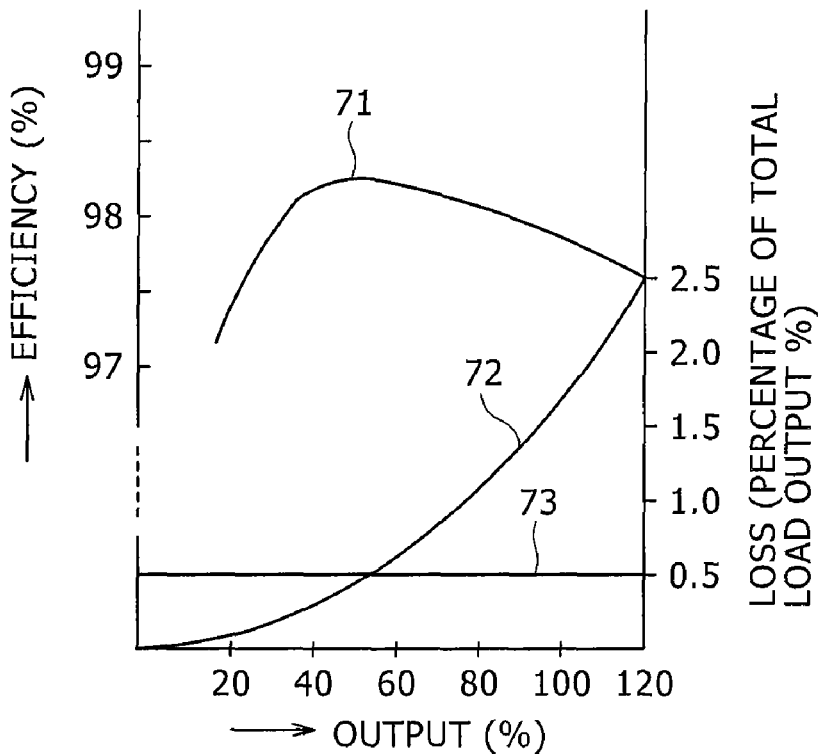
FIG. 6 is a diagram showing the efficiency of a transformer.
Figure 7:
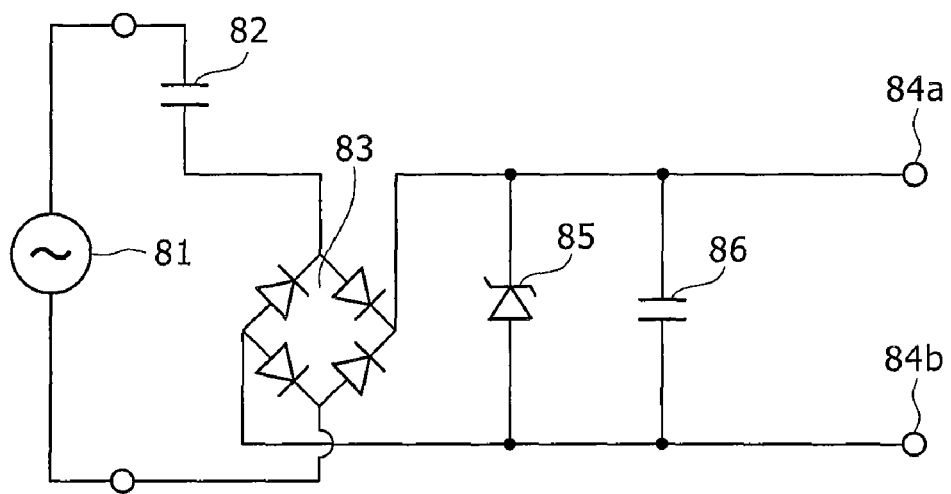
FIG. 7 is a diagram showing the lowering of voltage by a capacitor.

FIG. 4B shows examples of operation of the variable capacitor according to the present embodiment. FIG. 4A is a circuit diagram, and FIG. 4B is an operation diagram. In FIG. 4A, an AC input 61 is connected to an input terminal 65 of the variable capacitor 63. An output terminal 66 of the variable capacitor 63 is connected to a load 64. Control terminals 67 and 68 of the variable capacitor 63 are connected to a control unit 62.

For example, in the example of FIG. 4B(a), when control voltage is increased, the dielectric constant of the variable capacitor 63 is changed, and the capacitance value of the variable capacitor 63 is decreased. As a result, an input-to-output voltage drop 69 between the input terminal 65 and the output terminal 66 of the variable capacitor 63 for the AC input 61 is increased, so that an output voltage applied to the load 64 is decreased.

In a use of such a variable capacitor 63, for example, at a time of standby of a lamp dimmer circuit or an electronic device, standby power can be reduced by lowering input voltage to the circuit. At this time, since the control device is the capacitor, the voltage and current are out of phase with each other, and thus no power loss occurs in principle.

FIG. 4B(b) shows an example in which a varying voltage drop 70 absorbs variations in voltage of the AC input 61 and thereby achieves stabilization. The stabilization can be achieved by detecting the voltage applied to the load 64, comparing the voltage with a reference value, and feeding back an error voltage.

In a main application of the variable capacitor according to the present embodiment, the variable capacitor is disposed in a power supply circuit or the like, and is controlled by control voltage to optimize current or voltage. Therefore a current of a few A to a few mA flows in the input-output electrodes. The input-output electrodes thus need to be low in value of equivalent resistance, which causes a power loss and generation of heat, and be highly reliable.

On the other hand, because of a device operating principle of voltage control, no current flows in controlling electrodes in a steady state, and a current flows in the controlling electrodes only in a transient state. The value of the current is a few mA to a few µA, and is thus very small as compared with that of the input-output electrodes. Therefore a somewhat high equivalent resistance does not present a problem.

Accordingly, in examples of configuration of internal electrodes and external electrodes for input and output and for control as shown in FIGS. 1A, 1B, 1C, and 1D, the shapes and arrangement positions of both the electrodes are changed. FIGS. 1A, 1B, 1C, and 1D show the shapes of the external electrodes and the internal electrodes on respective ceramic green sheets, taking a chip laminated ceramic capacitor as an example.

FIGS. 1A, 1B, 1C, and 1D show examples of the outside and the electrodes of the variable capacitor according to the present embodiment. FIG. 1A shows an example where the input-output electrodes are disposed on the sides of shorter sides and the control electrodes are disposed on the sides of longer sides. FIG. 1B shows an example where the control electrodes and the input-output electrodes are disposed on the sides of the longer sides. FIG. 1C shows an example where the control electrodes and the input-output electrodes each divided into two parts are disposed on the sides of the longer sides. FIG. 1D shows an example where the input-output electrodes and the control electrodes each divided into two parts are disposed on the sides of the longer sides.

In FIGS. 1A, 1B, 1C, and 1D, schematic diagrams as viewed from above are provided in a first row; schematic diagrams as viewed from a side are provided in a second row; schematic diagrams when the input-output electrode a is viewed from above are provided in a third row; schematic diagrams when the input-output electrode b is viewed from above are provided in a fourth row; schematic diagrams when the control electrode a is viewed from below are provided in a fifth row; and schematic diagrams when the control electrode b is viewed from below are provided in a sixth row.

FIG. 1A shows the example where the input-output electrodes (terminals) 1 and 2 are disposed on the sides of the shorter sides and the control electrodes (terminals) 3 and 4 are disposed on the sides of the longer sides. As shown in the schematic diagram as viewed from above in the first row and the schematic diagram as viewed from a side in the second row, the control electrodes (terminals) 3 and 4 are disposed on the sides of the longer sides, and therefore the input-output electrodes 1 and 2 permitting a high current value and required to be highly reliable can have the same structure as an ordinary laminated ceramic capacitor. Therefore an advantage of readily obtaining high reliability at low cost is provided.

The input-output electrodes a(1) and b(2) shown in the schematic diagram when the input-output electrode a is viewed from above in the third row (the input-output electrode a is shown in a horizontally opposite direction with respect to the schematic diagram in the first row) and the schematic diagram when the input-output electrode b is viewed from above in the fourth row (the input-output electrode b is shown in a horizontally opposite direction with respect to the schematic diagram in the first row) are formed on ceramic green sheets. As indicated by a circle in the diagrams, an extraction opening 5 or 6 for the external electrode is disposed on a right or left (on the side of a shorter side).

The controlling electrodes a(4) and b(3) shown in the schematic diagram when the control electrode a is viewed from below in the fifth row and the schematic diagram when the control electrode b is viewed from below in the sixth row are similarly formed on ceramic green sheets. However, the controlling electrodes are different from the input-output electrodes in that extraction openings 7 and 8 are disposed on an upper side and a lower side (on the sides of the longer sides).

The ceramic green sheets having the input-output electrodes a(1) and b(2) and the controlling electrodes a(4) and b(3) formed thereon are alternately laminated as with AC electrodes 43 and control electrodes 44 as shown in FIG. 2B, and are connected to external electrodes 45 for external extraction.

FIG. 1A shows the input-output electrode a(1) and the input-output electrode b(2) as different electrodes in order to facilitate understanding. However, the electrodes are the same when rotated 180 degrees. The same is true for the controlling electrodes a(4) and b(3), and the controlling electrodes are the same when rotated 180 degrees. Hence, two patterns, that is, one pattern for the input-output electrodes and one pattern for the controlling electrodes suffice as electrode shapes.

Because of the low permissible current value of the controlling electrodes a(4) and b(3), it is possible to reduce electrode size and electrode thickness of the extraction parts 7 and 8, and reduce an amount of expensive precious metal such as palladium or the like. Alternatively, it is possible to use more inexpensive base metal such as nickel or the like.

The reduced thickness leads not only to a reduction in material cost but also to a decrease in height of parts, thereby making it possible to miniaturize the parts. Alternatively, capacitance can be increased with a larger number of stacked layers at a same height. Though not shown in the figure, the input-output electrodes may be disposed on the longer sides, and the controlling electrodes may be disposed on the shorter sides.

In this case, the size of the input-output electrodes can be further increased, so that more stable connection is made and thereby reliability can be improved.

In this example, the number of terminal surfaces for terminal mounting is four, which is equal to the number of terminals. It may therefore be difficult for an operator to pick up the variable capacitor with tweezers or the like at a time of manufacturing or repair, for example.

In FIG. 1B, on the other hand, terminal surfaces are provided on only the sides of the longer sides, so that a reduction to two terminal surfaces can be achieved with four terminals for input-output electrodes 11 and 13 and controlling electrodes 12 and 14 without the size of the input-output electrodes 11 and 13 being reduced. The two terminal surfaces provides an advantage in set manufacturing in that it is easy for an operator to pick up the variable capacitor with tweezers or the like at a time of manufacturing or repair, for example.

In this example, the electrode size of the left electrodes is different from that of the right electrodes, and there is a difference in heat capacity between the left electrodes and the right electrodes. Therefore, a thermal imbalance tends to occur in the direction of the longer sides, and a soldering defect such as one-side lifting or the like may be caused. In addition, the parts are oriented despite non-polarity thereof, and therefore there is a fear that the variable capacitor cannot be mounted in a horizontally opposite orientation on a same circuit pattern.

On the other hand, a thermal balance is attained by dividing the input-output electrodes into two left input-output electrodes and two right input-output electrodes in the direction of the longer sides, that is, input-output electrodes 21, 22, 23, and 24 in FIG. 1C and equally disposing the input-output electrodes on the left and the right, or dividing the controlling electrodes into two left controlling electrodes and two right controlling electrodes in the direction of the longer sides, that is, controlling electrodes 33, 34, 35, and 36 in FIG. 1D and equally disposing the controlling electrodes on the left and the right. Therefore reliability of soldering is improved.

The input-output electrodes 21 and 22 and the input-output electrodes 23 and 24 shown in FIG. 1C are the same when rotated 180 degrees. Similarly, the controlling electrode 25 and the controlling electrode 26 are the same when rotated 180 degrees.

The input-output electrode 31 and the input-output electrode 32 shown in FIG. 1D are the same when rotated 180 degrees. Similarly, the controlling electrodes 33 and 34 and the controlling electrodes 35 and 36 are the same when rotated 180 degrees.

Hence, two patterns, that is, one pattern for the input-output electrodes and one pattern for the controlling electrodes suffice as electrode shapes in the cases of FIGS. 1C and 1D. Thereby the variable capacitor can be mounted in an opposite orientation on a same circuit pattern. While the number of terminals is increased in the cases of FIGS. 1C and 1D, material cost can be held the same as in FIG. 1(a) when a total area of the electrodes is the same as in FIG. 1(a).

FIGS. 2A and 2B show an internal electrode configuration of the variable capacitor according to the present embodiment. FIG. 2A shows a circuit configuration representing electric connections. FIG. 2B shows an example of lamination of internal electrodes and connection of the internal electrodes to external electrodes.

In FIG. 2A, one electrode of an AC input 41 is connected to one input-output electrode ACa1 in a first layer and one input-output electrode ACa2 in a second layer. Another electrode of the AC input 41 is connected to another input-output electrode ACb1 in the first layer and another input-output electrode ACb2 in the second layer.

One electrode of a control input 42 is connected to one controlling electrode a1 in a first layer, one controlling electrode a2 in a second layer, and one controlling electrode a3 in a third layer. Another electrode of the control input 42 is connected to another controlling electrode b1 in the first layer and another controlling electrode b2 in the second layer.

A distance Lac between the one input-output electrode ACa1 in the first layer and the other controlling electrode b1 in the first layer is equal to a distance Ldc between the one controlling electrode a1 in the first layer and the one input-output electrode ACa1 in the first layer, where L denotes the thickness of a dielectric.

In FIG. 2B, ceramic green sheets on which AC electrodes 43 formed by input-output electrodes shown in FIG. 2A are formed and ceramic green sheets on which controlling electrodes 44 formed by controlling electrodes shown in FIG. 2A are formed are alternately laminated, and connected to respective external electrodes 46 and 45 for external extraction.

As shown in FIG. 2A, in the present embodiment, the controlling electrodes a1 and a3 are disposed at an outermost circumference, and are both set at a same potential. In the present embodiment, the number of controlling electrodes (five) is larger by one than the number of internal electrodes (four pairs) forming pairs with the input-output electrodes (four).

Further, the controlling electrodes are disposed at a middle position between input-output electrodes, and the dielectric thickness L is the same between the input-output electrodes and the controlling electrodes. Consideration is thus given so as to equally apply a controlling electric field generated by a controlling input voltage 42 to all dielectrics including dielectrics at the outermost circumference.

Thus, a variable capacitor whose capacitance can be stably controlled in a wide range can be obtained. Since the dielectrics of the stacked layers have the same thickness, withstand voltage between input-output terminals connected to the input-output electrodes and withstand voltage between controlling terminals connected to the controlling electrodes are substantially equal to each other.

In addition, the present invention is not limited to this, and the controlling input voltage 42 can be lowered by reducing a distance between controlling electrodes. FIG. 5 shows an example of configuration of internal electrodes in this case.

In FIG. 5, one electrode of an AC input 41 is connected to one input-output electrode ACa1 in a first layer and one input-output electrode ACa2 in a second layer. Another electrode of the AC input 41 is connected to another input-output electrode ACb1 in the first layer and another input-output electrode ACb2 in the second layer.

One electrode of a control input 42 is connected to one controlling electrode a1 in a first layer, one controlling electrode a2 in a second layer, one controlling electrode a3 in a third layer, and one controlling electrode a4 in a fourth layer. Another electrode of the control input 42 is connected to another controlling electrode b1 in the first layer, another controlling electrode b2 in the second layer, another controlling electrode b3 in the third layer, and another controlling electrode b4 in the fourth layer.

Thus, each input-output electrode is interposed between two controlling electrodes, whereby control efficiency can be improved.

A distance Lac between the one input-output electrode ACa1 in the first layer and the other controlling electrode b1 in the first layer is equal to a distance Ldc1 between the one controlling electrode a1 in the first layer and the one input-output electrode ACa1 in the first layer, where L denotes the thickness of a dielectric. Further, a distance Ldc2 between the other controlling electrode b1 in the first layer and the one controlling electrode a2 in the second layer is twice the above-described distance Ldc1.

While the above description has been made by taking a chip capacitor of a hexahedral structure as an example, the present embodiment is applicable to other part shapes and terminal shapes, and of course the capacitor does not need to be a ceramic capacitor as long as capacitance can be variably controlled.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A laminated variable capacitor comprising:
   a plurality of internal electrodes, formed within the laminated variable capacitor, including a plurality of internal input-output electrodes and a plurality of internal control electrodes, wherein each internal input-output electrode is interposed between two internal control electrodes;
   a plurality of external electrodes, formed on an outside of the laminated variable capacitor, including a plurality of external input-output electrodes connected to the internal input-output electrodes, and a plurality of external control electrodes connected to the internal control electrodes, wherein a total area of the external input-output electrodes is larger than a total area of the external control electrodes, and the external input-output electrodes are positioned on longer sides of said laminated variable capacitor.

2. The laminated variable capacitor of claim 1, wherein the external input-output electrodes are connected to an alternating current input, and wherein the external control electrodes are connected to a control unit.

3. The laminated variable capacitor of claim 1, wherein a total number of laminated variable capacitor surfaces having external electrodes mounted thereon is smaller than a total number of external electrodes.

4. The laminated variable capacitor of claim 1, wherein the external electrodes are formed by drawing out the internal electrodes to the outside of the laminated variable capacitor.

5. The laminated variable capacitor of claim 1, wherein the heat capacities of the external electrodes are substantially balanced with each other in both directions of the longer sides and shorter sides of the laminated variable capacitor.

6. The laminated variable capacitor of claim 1, wherein each of the internal electrodes is connected to external electrodes on only one surface of the laminated variable capacitor.

7. The laminated variable capacitor of claim 1, wherein outermost internal electrodes are internal control electrodes.

8. The laminated variable capacitor of claim 7, wherein each of the internal control electrodes, except for the outermost internal electrodes, is interposed between an internal input-output electrode and an other internal control electrode.

9. The laminated variable capacitor of claim 8, wherein the distance between the internal control electrode and the other internal control electrode is larger than a distance between the internal control electrode and the internal input-output electrode.

10. The laminated variable capacitor of claim 7, wherein the outermost internal electrodes are at the same potential and the variable capacitor comprises an odd number of internal electrodes.

11. The laminated variable capacitor of claim 1,
    wherein at least one of said longer sides of said variable capacitor has an external input-output electrode positioned between two external control electrodes.

12. The laminated variable capacitor of claim 1, wherein the external control electrodes are positioned on the longer sides of the laminated variable capacitor, and
    wherein each of said external input-output electrodes positioned on the longer sides of said variable capacitor has a larger area than each of the external control electrodes positioned on the longer sides of the laminated variable capacitor.

* * * * *